(12) United States Patent
Streeter

(10) Patent No.: US 11,635,054 B1
(45) Date of Patent: Apr. 25, 2023

(54) VERTICAL WATER PUMPING SYSTEM

(71) Applicant: Wilfred S. Streeter, Littleton, CO (US)

(72) Inventor: Wilfred S. Streeter, Littleton, CO (US)

(*) Notice: Subject to any disclaimer, the term of this patent is extended or adjusted under 35 U.S.C. 154(b) by 0 days.

(21) Appl. No.: 17/880,953

(22) Filed: Aug. 4, 2022

(51) Int. Cl.
| | |
|---|---|
| F03B 13/06 | (2006.01) |
| F03B 9/00 | (2006.01) |
| F03B 7/00 | (2006.01) |
| F03B 17/06 | (2006.01) |
| F04B 47/12 | (2006.01) |
| F04B 19/14 | (2006.01) |
| F03B 17/02 | (2006.01) |
| F03B 17/04 | (2006.01) |

(52) U.S. Cl.
CPC .......... *F03B 9/005* (2013.01); *F03B 7/006* (2013.01); *F03B 13/06* (2013.01); *F03B 17/02* (2013.01); *F03B 17/066* (2013.01); *F04B 19/14* (2013.01); *F04B 47/12* (2013.01); *F05B 2220/703* (2020.08); *F05B 2260/422* (2020.08); *F05B 2260/64* (2013.01)

(58) Field of Classification Search
None
See application file for complete search history.

(56) References Cited

U.S. PATENT DOCUMENTS

| | | | | |
|---|---|---|---|---|
| 1,444,180 A | * | 2/1923 | Gartling | F04B 19/14 |
| | | | | 417/320 |
| 1,677,802 A | * | 7/1928 | Jamesf | F04B 19/14 |
| | | | | 417/320 |
| 2,478,051 A | * | 8/1949 | Nordell | F04B 19/14 |
| | | | | 417/320 |
| RE24,497 E | * | 7/1958 | Vincent | F04B 47/12 |
| | | | | 417/320 |
| 3,010,232 A | * | 11/1961 | Jamesc | E02F 3/9237 |
| | | | | 299/8 |
| 3,057,094 A | * | 10/1962 | Winkelman | A01K 63/006 |
| | | | | 40/406 |
| 3,390,665 A | * | 7/1968 | Wininger | A01K 63/006 |
| | | | | 261/121.1 |

(Continued)

OTHER PUBLICATIONS

Muckle, Muckle's Naval Architecture, 1987, Butterworth & Co, Rev. ed, p. 80-85 (Year: 1987).*

*Primary Examiner* — Bryan M Lettman
*Assistant Examiner* — Geoffrey S Lee
(74) *Attorney, Agent, or Firm* — Edwin H. Crabtree; Ramur L. Pizarro

(57) ABSTRACT

A water pumping system used for lifting liquids in vertical or near vertical conduits or pipes to a higher elevation at a reduced energy cost. Also, the water pumping system can be used to circulate water between upper and lower elevations to generate hydropower energy at a lower energy cost. The water pumping system includes a water pump, air blowers, an air supply chamber, a lift conduit, a return conduit, a flotation device separation chamber, a plurality of floatation devices, one or more flotation device pushers, a dehydration unit, and two water storage tanks. The lift conduit and return conduit creating a continuous loop in which the flotation devices can circulate and act as a piston in the lifting conduit to elevate the water to higher elevations with reduced energy. The floatation devices include spacer rings and spacer rods. The floatation devices are inserted inside the lift conduit and the return conduit.

14 Claims, 4 Drawing Sheets

(56) References Cited

U.S. PATENT DOCUMENTS

| | | | | |
|---|---|---|---|---|
| 3,446,353 A * | 5/1969 | Nankivell | ............... | B03D 1/247 209/164 |
| 3,496,871 A * | 2/1970 | Stengel | ................... | F04B 17/00 310/12.21 |
| 3,537,192 A * | 11/1970 | Churchill | ............. | G09B 23/181 434/301 |
| 3,773,470 A * | 11/1973 | Rouzier | ................... | B01J 4/001 526/64 |
| 3,857,242 A * | 12/1974 | Gilmore | ................. | F03B 17/04 60/495 |
| 3,938,337 A * | 2/1976 | Fawcett | ............... | H02K 7/1869 60/682 |
| 4,160,427 A * | 7/1979 | Holbrook | ............... | A01K 63/006 40/406 |
| 4,265,599 A * | 5/1981 | Morton | ..................... | F04F 1/06 417/54 |
| 4,316,680 A * | 2/1982 | Phipps | ...................... | F04F 1/18 417/108 |
| 4,321,020 A * | 3/1982 | Mittal | ................... | F04B 17/044 417/320 |
| 4,326,132 A * | 4/1982 | Bokel | ..................... | F03B 17/02 290/1 R |
| 4,407,130 A * | 10/1983 | Jackson | ................. | F03B 17/02 415/7 |
| 4,456,119 A * | 6/1984 | in't Hout | ................ | F04B 19/14 198/535 |
| 4,713,937 A * | 12/1987 | De Shon | ............... | F03B 17/025 60/495 |
| 4,742,242 A * | 5/1988 | De Shon | ................. | F03B 17/02 290/1 R |
| 4,767,938 A * | 8/1988 | Bervig | ................. | F03B 17/005 290/1 R |
| 4,834,872 A * | 5/1989 | Overath | ................. | B03D 1/1493 210/151 |
| 4,981,015 A * | 1/1991 | Simpson | ................. | F03B 17/02 60/495 |
| 5,249,688 A * | 10/1993 | Hwang | .................. | B03D 1/247 210/221.2 |
| 5,266,240 A * | 11/1993 | Valenzuela | ......... | B01F 25/1041 261/93 |
| 6,073,585 A * | 6/2000 | Horvath | ............... | A01K 63/006 119/256 |
| 6,269,638 B1 * | 8/2001 | Murata | .................... | F01D 1/38 415/4.1 |
| 6,447,243 B1 * | 9/2002 | Kittle | ..................... | F03B 17/02 415/92 |
| 6,734,574 B2 * | 5/2004 | Shin | ........................ | F03B 17/04 310/152 |
| 6,748,679 B2 * | 6/2004 | Myers, Jr. | ................ | E02F 7/10 37/321 |
| 6,817,837 B2 * | 11/2004 | Hutchinson | ............... | F04F 3/00 417/174 |
| 6,863,807 B2 * | 3/2005 | Crawford, III | ........... | F04F 5/10 405/116 |
| 8,015,807 B1 * | 9/2011 | Akutsu | .................. | F03B 17/04 290/1 R |
| 8,920,135 B2 * | 12/2014 | Daily | .................... | F04B 31/00 417/328 |
| 9,719,528 B2 * | 8/2017 | Nakamura | ............. | E21C 50/00 |
| 9,745,952 B2 * | 8/2017 | Westmoreland | .......... | F03G 3/00 |
| 10,215,153 B1 * | 2/2019 | Mufdi | ...................... | F03B 15/00 |
| 10,267,287 B2 * | 4/2019 | Kile | ........................ | F03B 17/02 |
| 10,584,687 B2 * | 3/2020 | Filloramo | ............ | H02K 7/1853 |
| 11,333,125 B2 * | 5/2022 | Filloramo | ................ | F03G 3/00 |
| 2003/0145589 A1 * | 8/2003 | Tillyer | .................... | F03B 17/02 60/495 |
| 2003/0151258 A1 * | 8/2003 | Shin | ........................ | F03B 17/04 290/43 |
| 2006/0064975 A1 * | 3/2006 | Takeuchi | ................ | F03B 17/04 60/495 |
| 2007/0295668 A1 * | 12/2007 | Urizar | .................... | B03D 1/082 210/221.1 |
| 2008/0085158 A1 * | 4/2008 | Henderson | ............. | F03B 17/04 405/78 |
| 2009/0235659 A1 * | 9/2009 | Lin | ....................... | F03B 17/005 60/495 |
| 2010/0031651 A1 * | 2/2010 | Spataro | .................. | F03B 17/02 60/495 |
| 2010/0095666 A1 * | 4/2010 | Brumfield | ............... | F03B 17/02 60/495 |
| 2010/0180587 A1 * | 7/2010 | Manakkattupadeettathil | .............. | F03G 3/04 60/495 |
| 2010/0307149 A1 * | 12/2010 | Kwok | ....................... | F03G 7/10 60/496 |
| 2012/0198833 A1 * | 8/2012 | Francis | ................... | F03B 17/04 60/496 |

\* cited by examiner

PROCESS FLOW DIAGRAM

FLOTATION DEVICE WITH SPACER – TOP VIEW

FLOTATION DEVICE WITH SPACER - SIDE VIEW

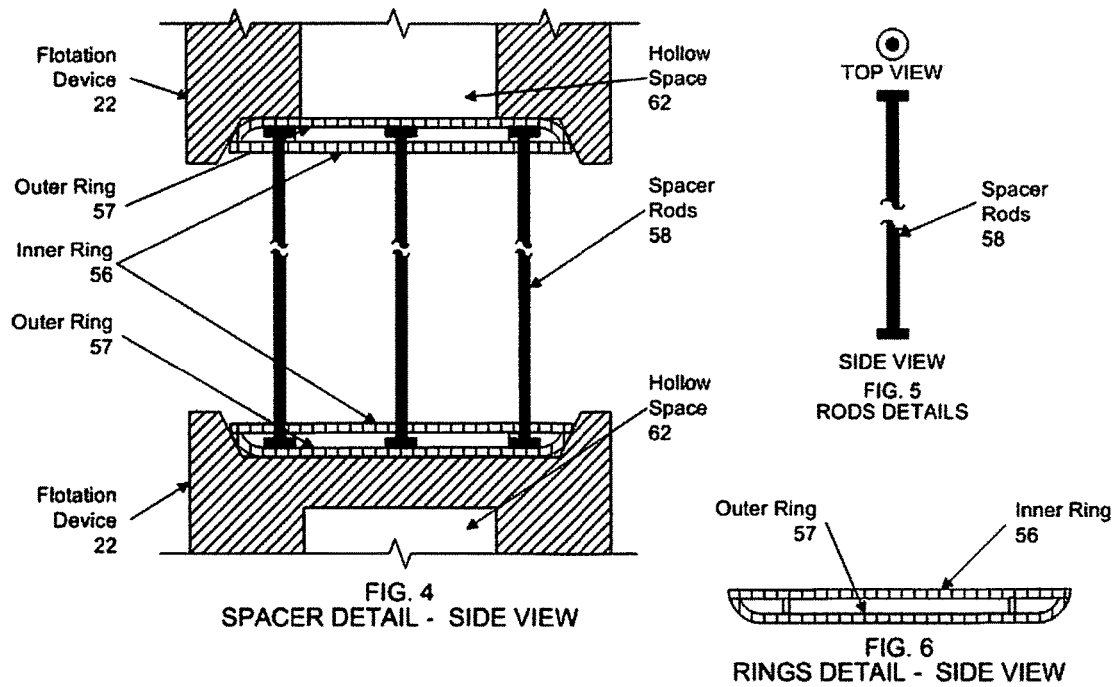
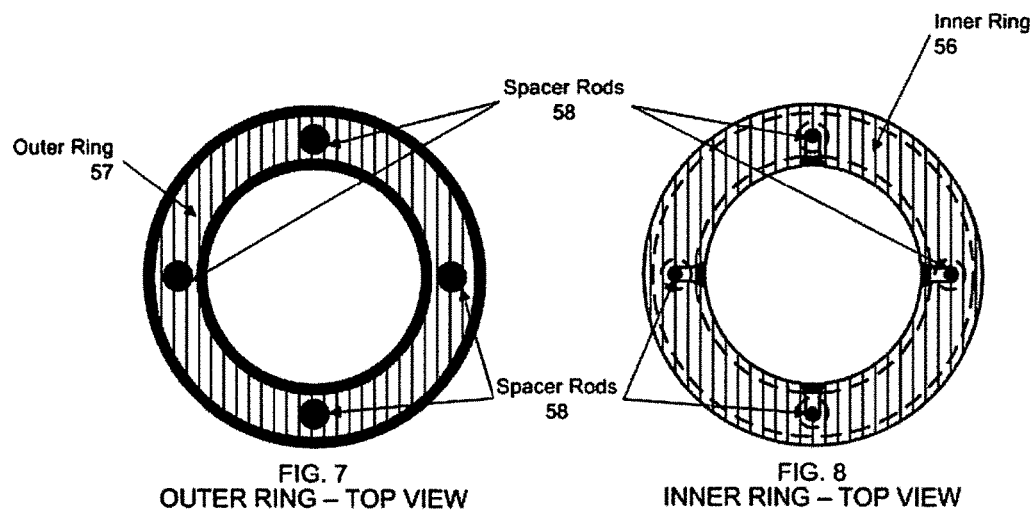

VERTICAL WATER PUMPING SYSTEM

This application is a Continuation-In-Part (CIP) of patent application Ser. No. 17/194,230, filed on Mar. 6, 2021, by the subject inventor, and having a title of Vertical Water Pumping System.

BACKGROUND OF THE INVENTION

(a) Field of the Invention

This invention relates to a vertical or near vertical water pumping system, and more particularly, but not by way of limitation, to an improved water pumping, or IWP, system used for lifting liquids vertically to a higher elevation at a reduced energy cost. Also, the water pumping system can be used to circulate water between upper and lower elevations to generate hydropower energy at a lower energy cost.

(b) Discussion of Prior Art

Heretofore, there have been a number of different types of air lift systems for lifting water and other fluids vertically or near vertically in a pumping system. An air lift system uses air injected into a water column for reducing energy needed to lift the water. In a similar system, natural gas, which is mostly methane, rather than air can be used with petroleum liquids and creates what is known in the petroleum industry as a gas lift system.

A mixture of water and air has a lower density than a mere column of water. This lower density mixture requires less energy to lift. Further, larger bubbles of air can form a piston in a vertical lift conduit to provide a buoyancy effect. The buoyancy effect helps push the water higher in a vertical lift conduit or a vertical lift pipe.

The subject invention provides an improved water pumping system, when compared to a standard pumping or air lift system, where a plurality of light weight floatation devices or objects are added to the vertical lift conduit as a substitute for adding air. The addition of the lightweight floatation devices provides both reduced density of the water being pumped vertically and an increased buoyancy effect to the water column.

SUMMARY OF THE INVENTION

In view of the foregoing, it is a primary objective of the subject invention to improve for greater efficiency of pumping water upwardly at a reduced energy cost.

The principles of an air-lift system show how air can reduce the energy requirement of pumping by decreasing the density and by adding a buoyancy effect of the air imparting upward pressure on the water. But, because bubbles of air have no tensile strength, this buoyancy effect is limited, so the flotation devices, made of a lightweight material such as a foam material or plastic, are inserted into the water stream as a substitute or supplement to the air.

The subject vertical water pumping system, through energy reduction, can be used for pumping water out of an underground mine or construction site, pumping water up to a water storage tank or water tower, pumping water to the top of a high-rise building, and for pumping water up a shaft or pipe in a pumped storage hydroelectric system.

Further, the water pumping system can be used to circulate water between upper and lower elevations to generate hydropower energy at a lower energy cost.

These and other objects of the present invention will become apparent to those familiar with different types of air lift and gas lift pumping systems when reviewing the following detailed description, showing novel construction, combination, and elements as herein described, and more particularly defined by the claims, it being understood that changes in the embodiments to the disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the subject vertical water pumping system, and in which:

FIG. 4 is a side sectional view of a portion of the spacer assembly with spacer rods and spacer rings fitted into a pair of flotation devices.

FIG. 5 is a side view of one of the spacer rods.

FIG. 6 is a side view of one of the spacer rings having an inner ring and an outer ring.

FIG. 7 is a top view of the outer ring with spaced apart spacer rods.

FIG. 8 is a top view of the inner ring with spaced apart spacer rods inserted into slots provided to hold the rods in place.

DESCRIPTION OF THE PREFERRED EMBODIMENTS

Figure 1:
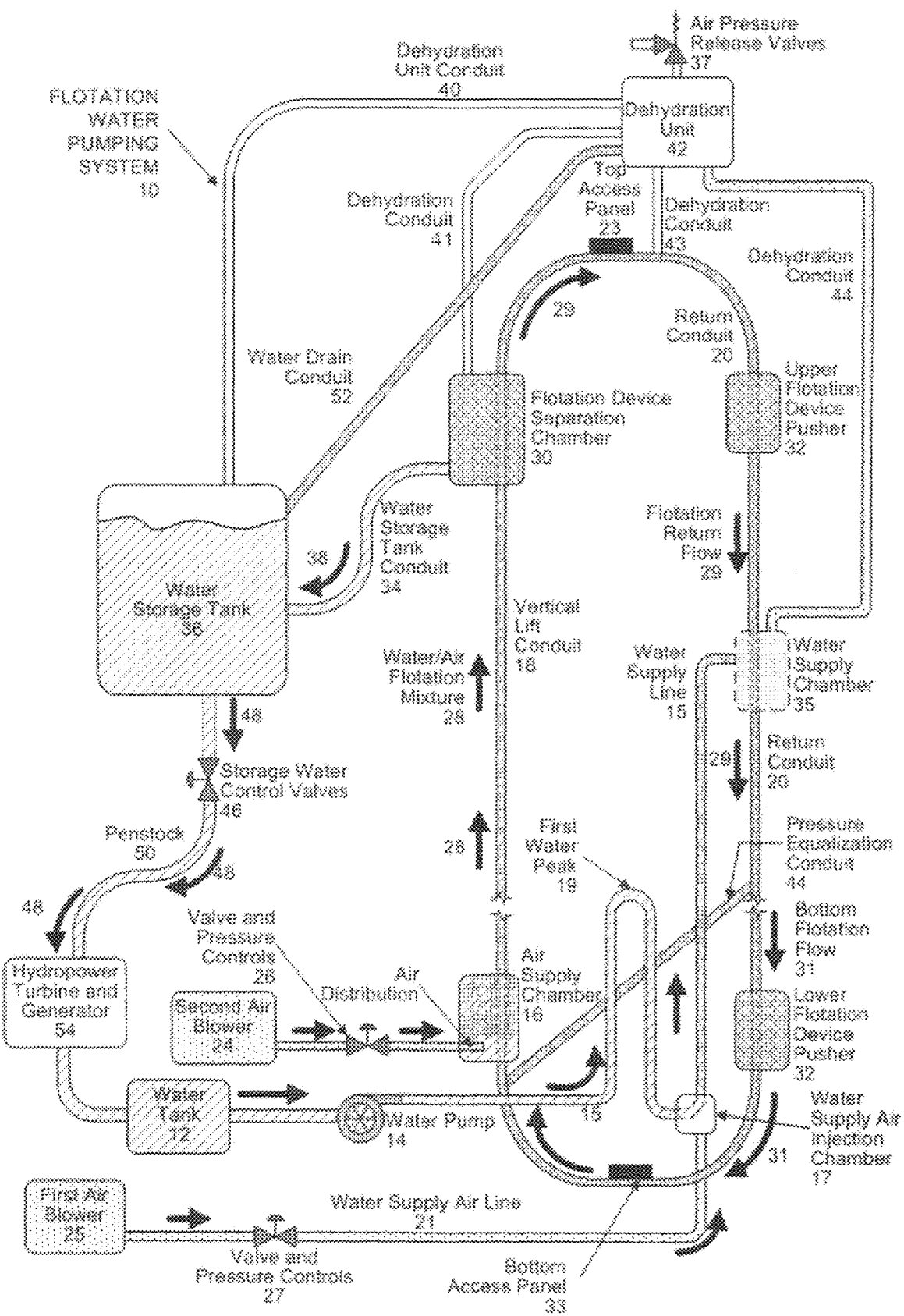
FIG. 1 illustrates a flow diagram of the subject water pumping system with water tank and pump, air blowers, air supply chamber, lift and return conduits or pipes, flotation device separation chamber, flotation device pushers, dehydration unit, and water storage tanks.

In FIG. 1, a flow diagram of subject water pumping system is shown and having general reference numeral 10. An important condition is that personnel access is always available to the equipment and facilities at the base of the system 10.

The pumping system 10 includes a lift conduit 18 and a return conduit 20. The conduits 18 and 20 are connected by a top arc and bottom arc, as shown in the drawing. The lift conduit 18 and the return conduit 20 form a continuous loop used to circulate flotation devices 22 in a circular, clockwise, flow, as indicated by arrows 28, 29 and 31. The three arrows represent three segments of different types of flow of the flotation devices 22 in the conduits 18 and 20.

The pumping system 10 includes a water tank 12 collecting water from previous cycles in the improved water pumping system. The water tank 12 feeds water to a water pump 14. The water pump 14 can include a variable speed or variable frequency motor that can be adjusted to optimize the energy used to insert the water into a water supply line 15.

Figure 2:
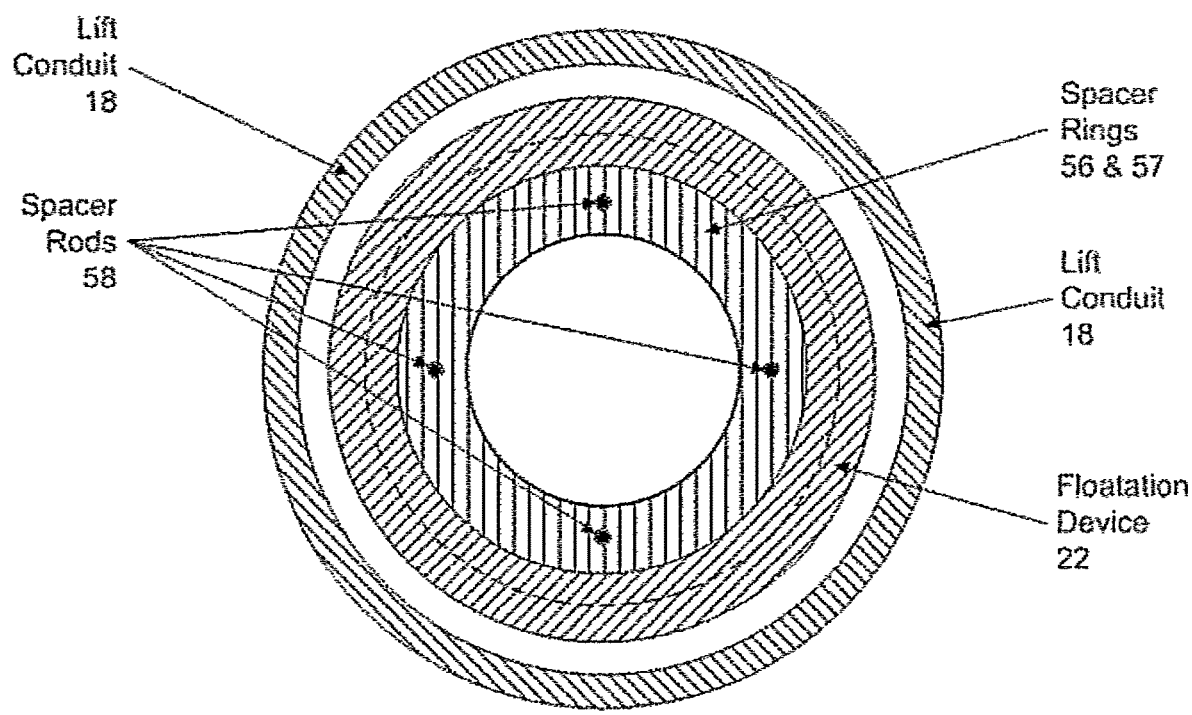
FIG. 2 illustrates a top sectional view of a lift conduit with a floatation device and spacer rings and spacer rods.
Figure 3:
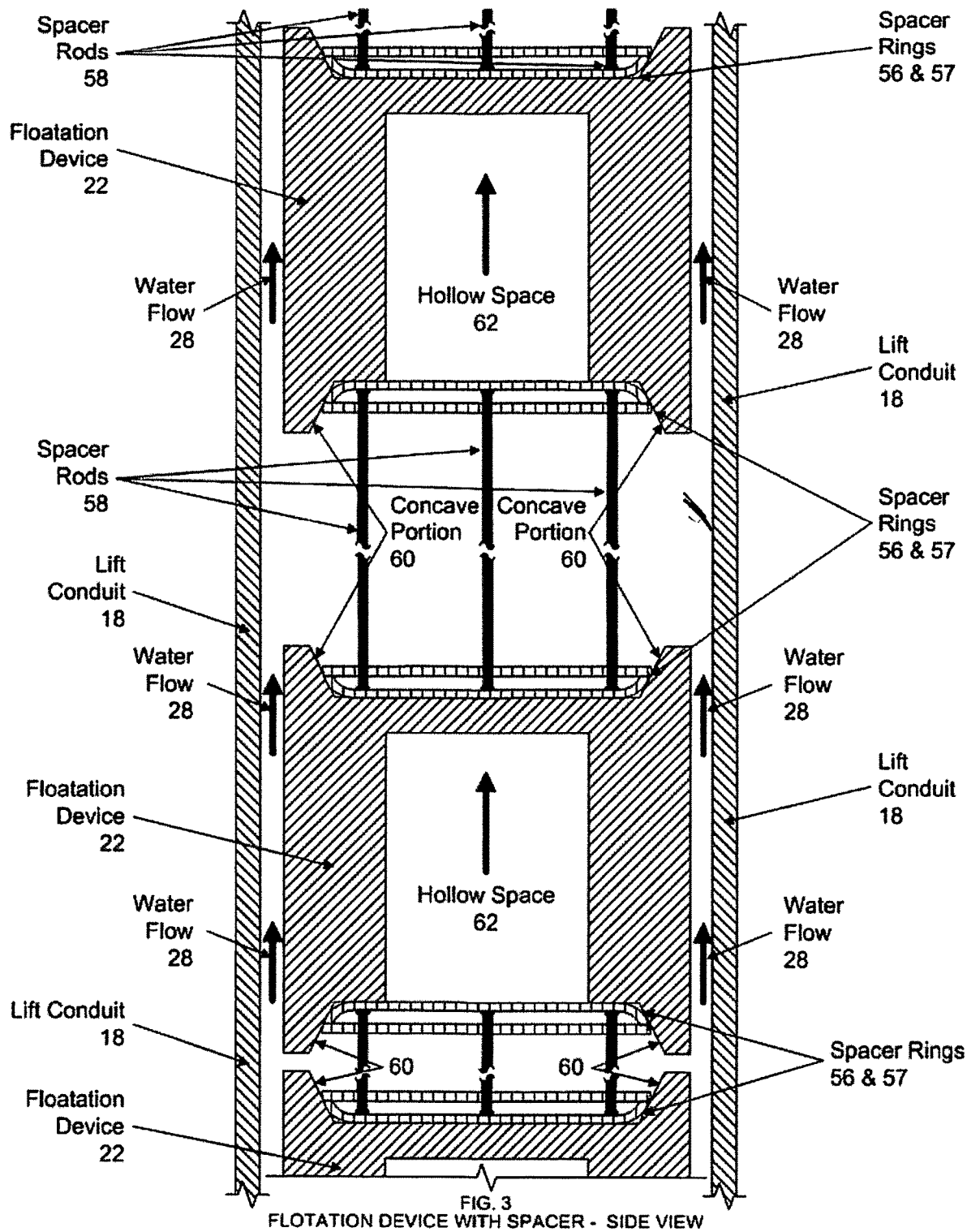
FIG. 3 is a side sectional view of the lift conduit, as shown in FIG. 2, with a floatation device inserted inside the lift conduit with a spacer assembly having spacer rings and spacer rods.

As shown in this drawing and an important feature of the system 10, the water supply line 15 rises to a first water peak 19 where the water then drops down to an intermediate low point, where the water supply line air injection chamber 17 is located. First air blower 25 injects air through a water supply air line 21 into water supply air injection chamber 17. This feature creates an air-lift pump that lifts the air-water mixture in water supply line 15 to a height considerably greater than the first water peak 19 and into the water supply chamber 35. The water supply chamber 35 is designed to cause the water to fall into the hollow bottom of the flotation devices 22, as they pass through the water supply chamber 35. The flotation devices 22 that create a continuous chain of objects in the conduit loop are shown in FIGS. 2, 3, and 4.

Air is separated from the water in the water supply chamber 35 and passes into a dehydration conduit 44. The water in the hollow bottom of the flotation devices 22 adds weight to the column of flotation devices in the middle portion of the return conduit 20 which is mostly filled with air. The flotation devices 22 are traveling down the return conduit 20 from the upper flotation device pusher 32.

Return conduit 20 gets an additional injection of water from water equalization conduit 44. In the segment of the return conduit 20 below this intersection the conduit is filled with water. As the flotation devices 22, move down into that lower portion of return conduit 20 that is filled with water the flotation devices will create an upward buoyancy force resisting the direction of movement. This force is overcome by the weight of water in the hollow bottom of the flotation devices 22 in the middle section of the return conduit 22 filled with air and by the force from the upper flotation device pusher 32. These two forces push the flotation devices 22 into the lower flotation device pusher 32 at the base of the return conduit 20. The lower flotation device pusher 32 provides an additional push to propel the flotation devices through the lower arc and into the lift conduit 18.

In all of the segment of the loop marked by arrow 31, including the lower portion of the return conduit 20 below the pressure equalization conduit 44 and the lower arc to the air supply chamber 16, the conduit 20 is filled with water The next segment of the loop, indicated by arrow 28, is the lifting section in the loop. As the flotation devices 22 approach the base of the lift conduit 18, they will pass thru the air supply chamber 16. In the air supply chamber 16, a stream of pressurized air supplied from second air blower 24 will be injected into the lift conduit in a manner that a large portion of the air will be trapped in the concave hollow space 62 of flotation device 22, as shown in FIG. 3. This reduces the density of the flotation device and increases the buoyancy force the flotation device can impart on the water in the space between the flotation device and the next device immediately above it in the lift conduit 18. As the air is injected into the air supply chamber 16 it creates an excess pressure condition and requires an outlet for the release of the water displaced by the injected air. This outlet is supplied by the pressure equalization conduit 44 that allows water to flow to the return conduit 20 where it fills the lower portion of the return conduit 20.

The lift conduit 18 and the return conduit 20 can have a diameter that ranges from a few inches in diameter to pipes a few feet in diameter and greater as needed to provide the required flow of water through the system. The air supply chamber 16 is larger than the lift conduit 18 for receiving the air and a plurality of flotation devices therein. The lifting mixture of air and flotation devices 22, acting in the water in lift conduit 18, as shown as arrows 28, rise upwardly as a series of pistons in the lift conduit, to various height elevations, to a flotation device separation chamber 30. The flotation device 22 can be made of light weight material, such as Styrofoam, plastic or other light weight material.

The flotation device separation chamber 30 is used to separate the respective streams of water, air, and the flotation devices 22. The water flows from openings near the bottom of the separation chamber 30, through a water storage tank conduit 34, as indicated by arrow 38, into a storage tank 36. The flotation devices 22 are pushed up through the upper arc to the return conduit 20 as indicated by arrows 29. The flotation devices 22 are pushed down the return conduit 20 by upper flotation device pusher 32, as previously described. A train of flotation devices 22 are then returned through the conduit loop to the lift conduit 18.

Most of the air in the in the lift conduit 18 will rise through dehydration unit conduit 41, provided at the top of the floatation device separation chamber 30 and into dehydration unit 42. Also, some of the air will be mixed with the water that flows through the water drain conduit 52 into the storage tank 36.

In the storage tank 36, the air will float to the top and enter the dehydration conduit 40 at the top of storage tank 36, which is connected to the dehydration unit 42. Also, a dehydration conduit 43 will allow air that is trapped in a hollow center portion of the flotation device 22 to flow into the dehydration unit 42. The dehydration unit 42 is provided to reduce or eliminate moisture in the air stream, before it is discharge from the water pumping system. The dehydration unit 42 includes an air pressure release valve 37 for venting air pressure from the unit. Water from the air streams in the dehydration unit 42 will drain into water storage tank 36 through a water drain conduit 52.

In FIG. 2, a top sectional view of a portion of the annular-shaped lift conduit 18 is shown. In this drawing, the top of a spacer ring 56 is illustrated with spacer rods 58 and disposed on top of the floatation device 22. The flotation device 22 occupies most of the cross-sectional area of the lift conduit 18.

In FIG. 3, a side cutaway view of the lift conduit 18 is shown with a series of floatation devices 22 inserted inside the lift conduit 18. In this drawing, one of the floatation devices 22 is shown with a pair of inner and outer spacer rings 56 and 57 received inside a concave portion 60 in the bottom of device and holding the rings therein. Also, another pair of spacer rings 56 and 57 are shown received inside the concave portion 60 in the top of the next flotation device 22 and holding the pair of rings therein. The purpose of the spacer assembly and the length of the spacer rods is to provide a fixed quantity of water between two consecutive flotation devices in the stream of devices 22 rising in the lift conduit.

Further, a lower hollow center portion 62 of the device 22 is shown in FIG. 3. The hollow center portion 62 is used to trap air, when introduced in the lift conduit mixing chamber 16. This feature further reduces the density of the flotation device 22 and effectively increases the buoyancy effect of flotation device 22 to push water upwardly in the lift conduit 18.

The air, as it is injected into the lift conduit mixing chamber 16, is under pressure equal to or greater than the pressure of water in the mixing chamber 16. The injected air may not fill the entire concave space 62 on the bottom of the floatation device when present in the mixing chamber 16. As the device rises in the lift conduit 18, the water pressure will decrease, allowing the air in the concave space 62 to expand. At some level in the lift conduit 18, the volume of expanding air will be greater than the volume of the space, at which point it will leak out of the hollow concave space 62 and around the edges of the flotation device 22 into the space between the device and lift conduit 18 walls. The leaking air will provide an additional lifting force on the water in the upper portion of the lift conduit 18.

In FIG. 4, a side sectional view of a portion of the spacer assembly is shown with spacer rods 58 and spacer rings 56 and 57 fitted into the concave portion in the top and the bottom of a pair of flotation devices 22.

In FIG. 5, a side view and a top view of one of the spacer rods 58 are illustrated.

In FIG. 6, a side view of one of the spacer rings is shown with the inner ring 56 and the outer ring 57.

In FIG. 7, a top view of the outer ring 57 is shown with spaced apart spacer rods 58.

In FIG. 8, a top view of the inner ring 58 is shown with spaced apart spacer rods 58 inserted into slots provided to hold the rods in place.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The invention claimed is:

1. A vertical or near vertical water pumping system used for lifting liquids vertically to a higher elevation, the water pumping system comprising: a vertical lift conduit connected to a return conduit, the lift conduit and the return conduit forming a continuous loop; a flotation device separation chamber connected to the lift conduit; a plurality of floatation devices received in the floatation device separation chamber, received in the vertical lift conduit, and received in the return conduit, the floatation devices for decreasing the density of an air-water mixture and increasing the buoyancy of the flotation device in the air-water mixture in the lift conduit; a water tank connected to a water pump, the water pump connected to a water supply air injection chamber; a water supply line connected to the water supply air injection chamber; a water supply chamber, the water supply line connected to the water supply chamber, the water supply chamber attached to the return conduit for providing the air-water mixture to the return conduit and the lift conduit; and a first air blower connected to the water supply air injection chamber for providing air to the water supply chamber; wherein the floatation devices include spacer rings and spacer rods disposed between adjacent floatation devices for providing separation therebetween.

2. The water pumping system as described in claim 1 further including a second air blower connected to an air supply chamber, the air supply chamber attached to the lift conduit.

3. The water pumping system as described in claim 1 further including the floatation device separation chamber attached to the lift conduit for separating water, air and the floatation devices in the lift conduit.

4. The water pumping system as described in claim 1 further including one or more flotation device pushers received in the return conduit.

5. The water pumping system as described in claim 1 further including a dehydration unit connected to the floatation device separation chamber.

6. The water pumping system as described in claim 1 further including a water storage tank connected to the floatation device separation chamber.

7. The water pumping system as described in claim 6 wherein the water storage tank is connected to a hydropower turbine and generator for generating electrical power.

8. The water pumping system as described in claim 1 wherein the floatation devices include a hollow space in the bottom of each of the devices for trapping air therein and adding buoyancy to the devices.

9. A vertical or near vertical water pumping system used for lifting liquids vertically to a higher elevation, the water pumping system comprising: a vertical lift conduit connected to a return conduit, the lift conduit and the return conduit forming a continuous loop; a flotation device separation chamber connected to the lift conduit; a plurality of floatation devices received in the floatation device separation chamber, received in the vertical lift conduit, and received in the return conduit, the floatation devices for decreasing the density of an air-water mixture and increasing the buoyancy of the flotation device in the air-water mixture in the lift conduit; a water tank connected to a water pump, the water pump connected to a water supply air injection chamber; a water supply line connected to the water supply air injection chamber; a water supply chamber, the water supply line connected to the water supply chamber, the water supply chamber attached to the return conduit for providing the air-water mixture to the return conduit and the lift conduit; a first air blower connected to the water supply air injection chamber for providing air to the water supply chamber; a second air blower connected to an air supply chamber, the air supply chamber attached to the lift conduit; and the floatation device separation chamber attached to the lift conduit for separating water, air and the floatation devices in the lift conduit; wherein the floatation devices include spacer rings and spacer rods disposed between adjacent floatation devices for providing separation therebetween.

10. The water pumping system as described in claim 9 further including one or more flotation device pushers received in the return conduit.

11. The water pumping system as described in claim 9 further including a dehydration unit connected to the floatation device separation chamber.

12. The water pumping system as described in claim 9 further including a water storage tank connected to the floatation device separation chamber.

13. The water pumping system as described in claim 12 wherein the water storage tank is connected to a hydropower turbine and generator for generating electrical power.

14. The water pumping system as described in claim 9 wherein the floatation devices include a hollow space in the bottom of each of the devices for trapping air therein and adding buoyancy to the devices.

\* \* \* \* \*